US012659123B2

(12) United States Patent
Au

(10) Patent No.: US 12,659,123 B2
(45) Date of Patent: Jun. 16, 2026

(54) REDUCTION OF INTERFERENCE DUE TO AN ATMOSPHERIC CONDITION

(71) Applicant: T-MOBILE INNOVATIONS LLC, Overland Park, KS (US)

(72) Inventor: Chad Chun Fai Au, Kirkland, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 364 days.

(21) Appl. No.: 18/400,590

(22) Filed: Dec. 29, 2023

(65) Prior Publication Data

US 2025/0219800 A1     Jul. 3, 2025

(51) Int. Cl.
*H04L 5/00* (2006.01)
*H04W 72/044* (2023.01)
*H04W 72/541* (2023.01)

(52) U.S. Cl.
CPC ....... *H04L 5/0073* (2013.01); *H04W 72/0473* (2013.01); *H04W 72/541* (2023.01)

(58) Field of Classification Search
CPC ............ H04L 5/0073; H04W 72/0473; H04W 72/541; H04B 7/0617
See application file for complete search history.

(56) References Cited

U.S. PATENT DOCUMENTS

| | | | | |
|---|---|---|---|---|
| 10,348,382 B1 * | 7/2019 | Jensen | ...................... | H04B 1/04 |
| 10,924,230 B1 * | 2/2021 | Marupaduga | ......... | H04L 5/0073 |
| 2004/0048575 A1 * | 3/2004 | Goldberg | ............. | H04B 1/1081 |
| | | | | 455/65 |
| 2007/0194986 A1 * | 8/2007 | Dulmovits, Jr. | ..... | H04B 7/0617 |
| | | | | 342/371 |
| 2018/0294853 A1 * | 10/2018 | Mochida | .............. | H04B 7/0456 |
| 2019/0280743 A1 * | 9/2019 | Bengtsson | .......... | H04W 56/001 |
| 2021/0135359 A1 * | 5/2021 | Anderson | ................ | H01Q 3/36 |
| 2021/0368477 A1 * | 11/2021 | Park | ..................... | H04B 7/0621 |
| 2022/0279501 A1 * | 9/2022 | Tsui | .................... | H04L 25/0222 |
| 2022/0295306 A1 * | 9/2022 | Marupaduga | ........ | H04B 7/0617 |
| 2023/0006754 A1 * | 1/2023 | Bellemare | ........... | H04J 13/0048 |
| 2023/0155639 A1 * | 5/2023 | Gutman | ............... | H04B 7/0617 |
| | | | | 375/262 |
| 2023/0217375 A1 * | 7/2023 | Sung | ................... | H04W 52/243 |
| | | | | 455/522 |
| 2023/0308896 A1 * | 9/2023 | Jayasimha | ........... | H01Q 21/061 |
| 2023/0408629 A1 * | 12/2023 | Coudert | ............... | G01S 5/0284 |
| 2023/0412285 A1 * | 12/2023 | West | ...................... | H01Q 3/267 |
| 2025/0219800 A1 * | 7/2025 | Au | ........................ | H04L 5/0073 |
| 2025/0226860 A1 * | 7/2025 | Mansour | ............. | H04B 7/0608 |
| 2025/0254534 A1 * | 8/2025 | Omaira | ................ | H04B 17/345 |
| 2025/0317246 A1 * | 10/2025 | Ozozlu | .................... | H04L 5/14 |

* cited by examiner

*Primary Examiner* — Ivan O Latorre
(74) *Attorney, Agent, or Firm* — Shook, Hardy & Bacon L.L.P.

(57) ABSTRACT

Systems and methods are provided for selecting an antenna amplitude taper to transmit wireless signals to a coverage area from a base station. A first interference level at a victim cell is determined when using a first amplitude taper. A second interference level at a victim cell is determined when using a second amplitude taper. Based on determining that the second interference level is less than the first interference level, the second amplitude taper is selected to transmit the wireless signals to the coverage area form the set of antenna elements at the base station.

20 Claims, 7 Drawing Sheets

400

┌─ 402
DETERMINE A FIRST INTERFERENCE LEVEL AT A VICTIM CELL WHEN WIRELESS SIGNALS ARE TRANSMITTED TO A COVERAGE AREA FROM A SET OF ANTENNA ELEMENTS AT A BASE STATION USING A FIRST AMPLITUDE TAPER

┌─ 404
DETERMINE A SECOND INTERFERENCE LEVEL AT THE VICTIM CELL WHEN THE WIRELESS SIGNALS ARE TRANSMITTED TO THE COVERAGE AREA FROM THE SET OF ANTENNA ELEMENTS AT THE BASE STATION USING A SECOND AMPLITUDE TAPER

┌─ 406
DETERMINE THAT THE SECOND INTERFERENCE LEVEL IS LESS THAN THE FIRST INTERFERENCE LEVEL

┌─ 408
UPON DETERMINING THAT THE SECOND INTERFERENCE LEVEL IS LESS THAN THE FIRST INTERFERENCE LEVEL, SELECT THE SECOND AMPLITUDE TAPER TO TRANSMIT THE WIRELESS SIGNALS TO THE COVERAGE AREA FROM THE SET OF ANTENNA ELEMENTS AT THE BASE STATION

┌─ 410
TRANSMIT THE WIRELESS SIGNALS TO THE COVERAGE AREA FROM THE SET OF ANTENNA ELEMENTS AT THE BASE STATION USING THE SECOND AMPLITUDE TAPER

100

103

105

110

User
Device
140

User
Device
150

200

107

105

106

103

110

User
Device
140

105
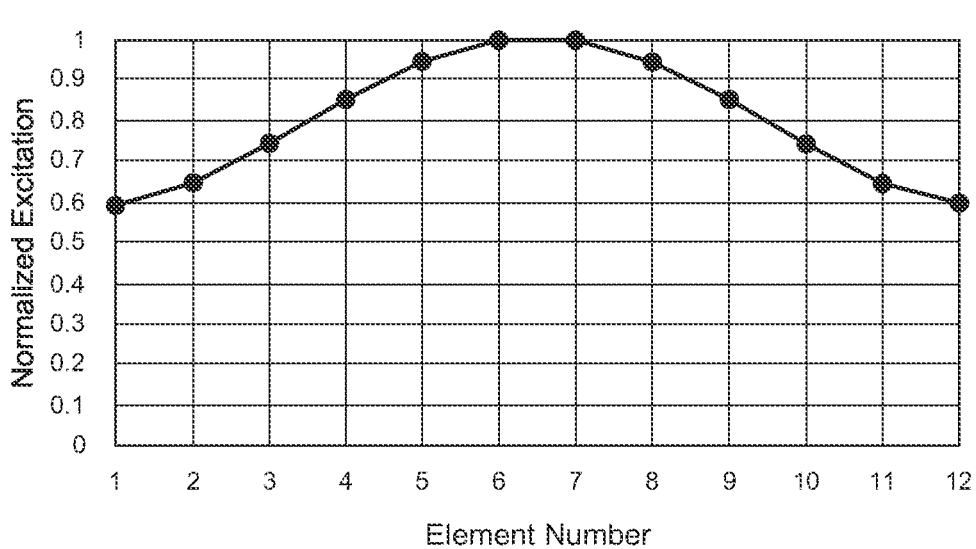
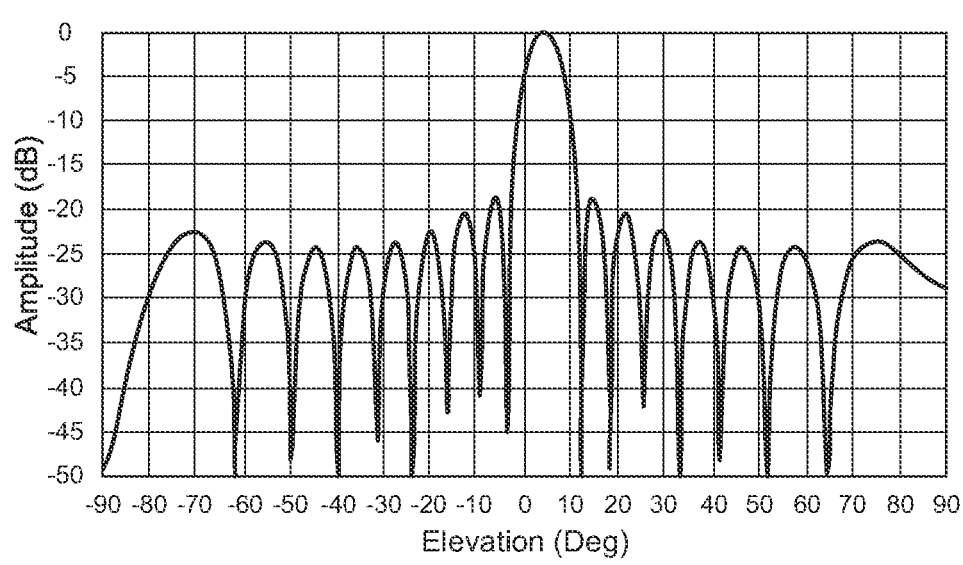
*FIG. 3B*

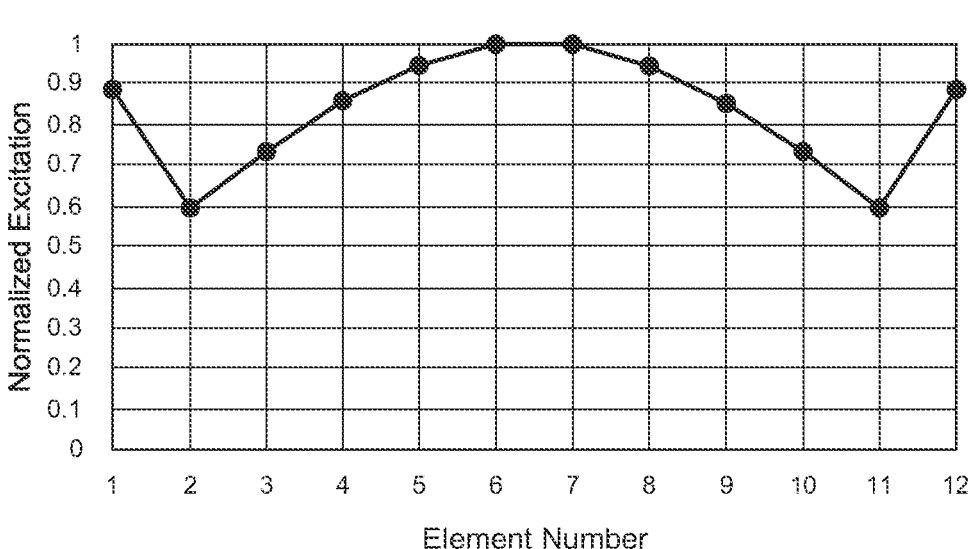
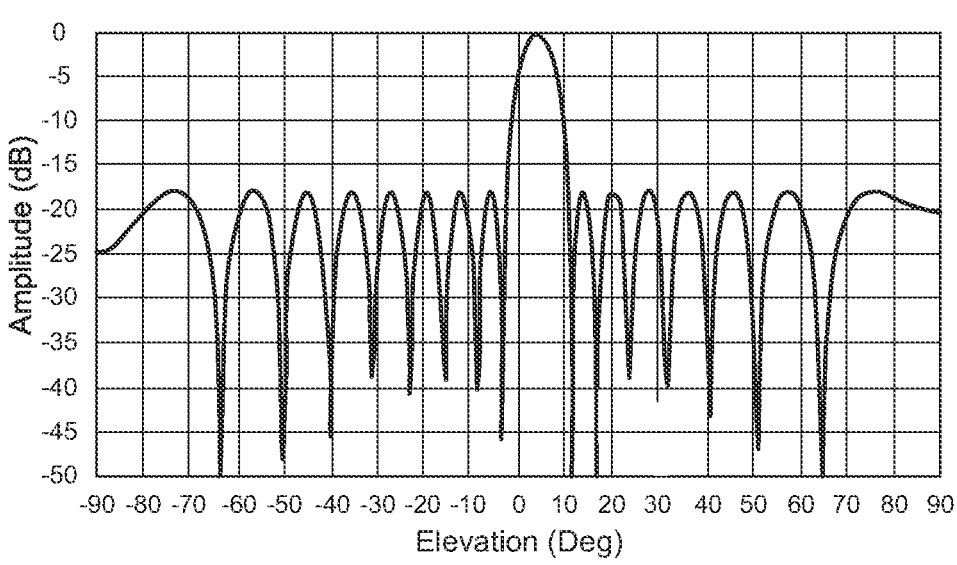
*FIG. 3C*

400

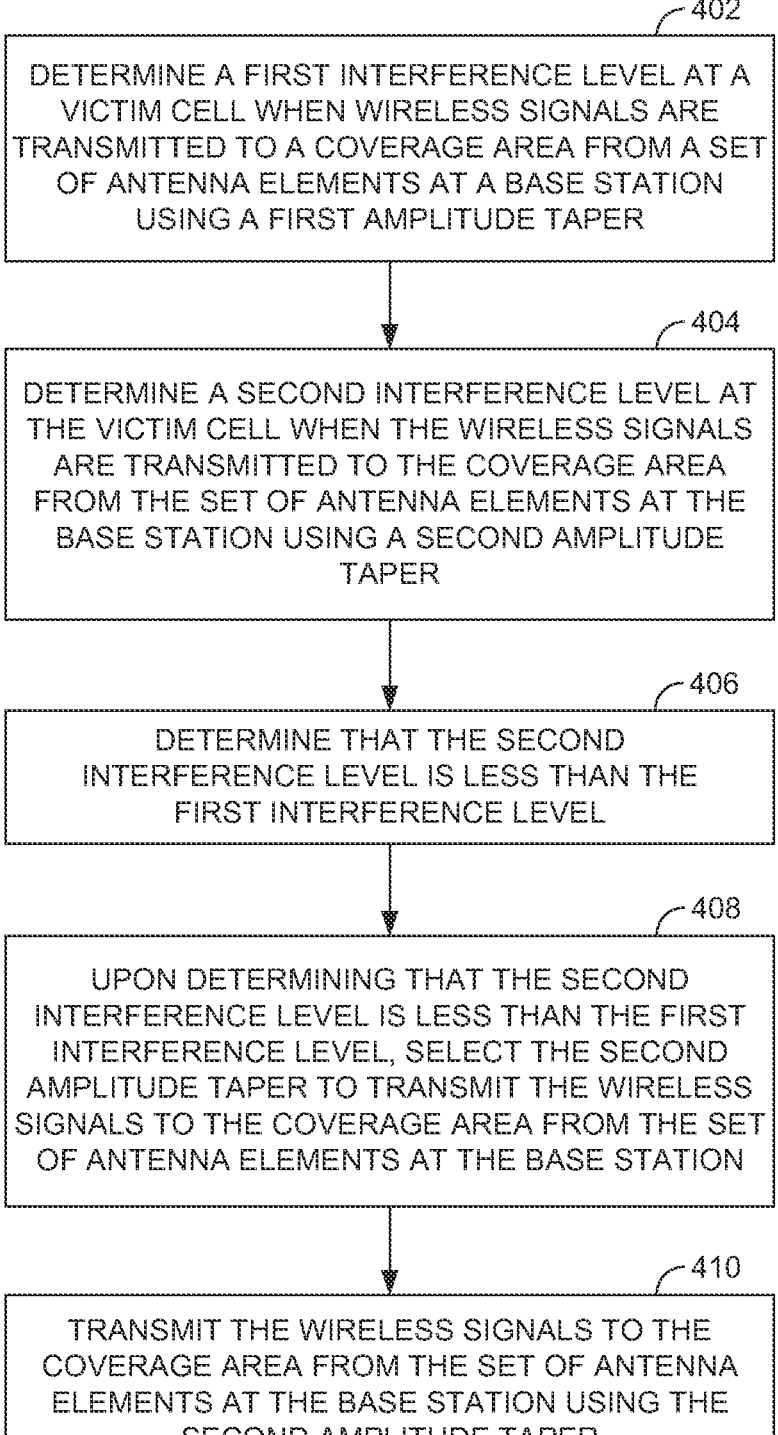

402

DETERMINE A FIRST INTERFERENCE LEVEL AT A VICTIM CELL WHEN WIRELESS SIGNALS ARE TRANSMITTED TO A COVERAGE AREA FROM A SET OF ANTENNA ELEMENTS AT A BASE STATION USING A FIRST AMPLITUDE TAPER

404

DETERMINE A SECOND INTERFERENCE LEVEL AT THE VICTIM CELL WHEN THE WIRELESS SIGNALS ARE TRANSMITTED TO THE COVERAGE AREA FROM THE SET OF ANTENNA ELEMENTS AT THE BASE STATION USING A SECOND AMPLITUDE TAPER

406

DETERMINE THAT THE SECOND INTERFERENCE LEVEL IS LESS THAN THE FIRST INTERFERENCE LEVEL

408

UPON DETERMINING THAT THE SECOND INTERFERENCE LEVEL IS LESS THAN THE FIRST INTERFERENCE LEVEL, SELECT THE SECOND AMPLITUDE TAPER TO TRANSMIT THE WIRELESS SIGNALS TO THE COVERAGE AREA FROM THE SET OF ANTENNA ELEMENTS AT THE BASE STATION

410

TRANSMIT THE WIRELESS SIGNALS TO THE COVERAGE AREA FROM THE SET OF ANTENNA ELEMENTS AT THE BASE STATION USING THE SECOND AMPLITUDE TAPER

*FIG. 4*

REDUCTION OF INTERFERENCE DUE TO AN ATMOSPHERIC CONDITION

SUMMARY

The present disclosure is directed, in part, to selecting an antenna amplitude taper to transmit wireless signals to a coverage area during an atmospheric condition, substantially as shown in and/or described in connection with at least one of the figures, and as set forth more completely in the claims.

In aspects set forth herein, an amplitude taper of antenna elements transmitting a signal to a coverage from a base station is selected in order to reduce interference at a victim cell. Meteorological events such as a tropospheric duct, or geographic features such as bodies of water, often affect the propagation of signals by reflecting or refracting them in unintended directions or for distances much greater than anticipated or intended. Consequently, a cell (e.g., the victim cell) that is not intended to be in communication with the base station (e.g., an aggressor cell) may receive signals from the base station, causing interference with respect to signals received by the victim cell. The present disclosure is directed to systems and methods that identify and mitigate telecommunications-performance-impairing interference.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein:

FIG. 3B illustrates an example amplitude taper and resulting beam for use by the cell site of FIG. 3A in accordance with an example embodiment;

FIG. 3C illustrates another example amplitude taper and resulting beam for use by the cell site of FIG. 3A in accordance with an example embodiment;

FIG. 4 depicts a flowchart of an exemplary method for selecting an antenna amplitude taper to transmit wireless signals to a coverage area during an atmospheric condition in accordance with an example embodiment.

DETAILED DESCRIPTION

Figure 1:
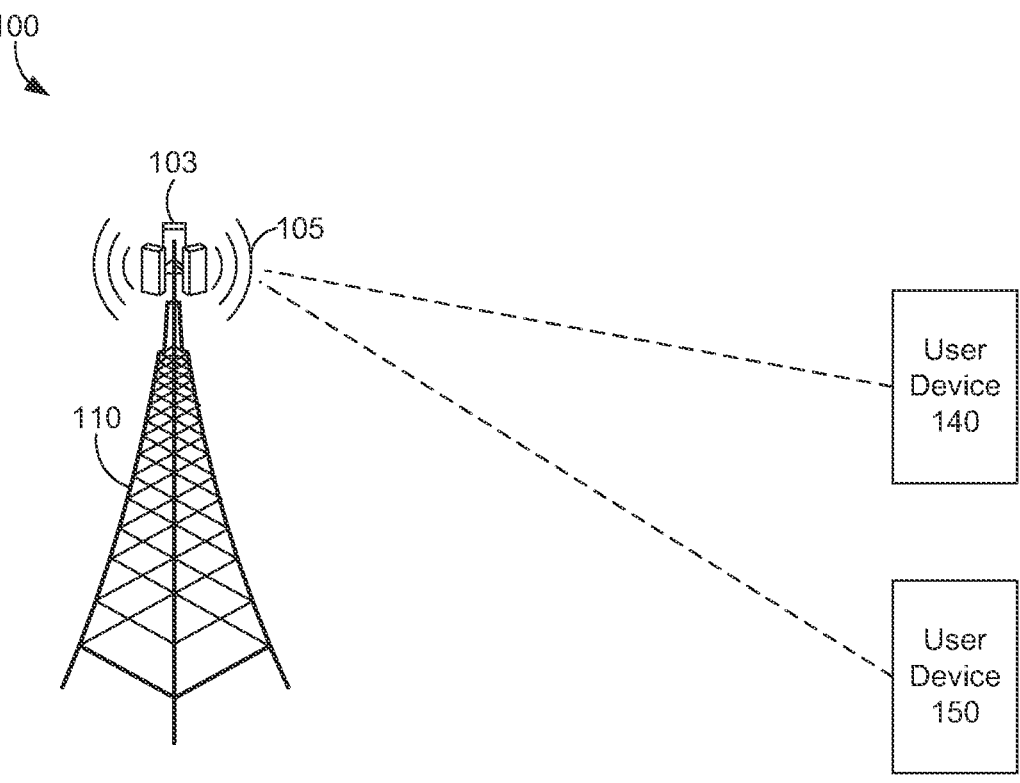
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, non-transitory and/or transitory media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

In brief, and at a high level, this disclosure describes, among other things, methods and systems for provided for determining an interference level at a victim cell when an offending base station is transmitting signals from a set of antenna elements using different amplitude tapers, and then selecting the amplitude taper to be used based on the amplitude causing less interference at the victim cell. A victim cell may experience service degradations as a result of downlink signals from the offending (distant) base station. In some cases, the downlink signals from the offending base station may be received at the victim cell at a time when it is slotted to receive signals in the uplink timeslot from a user device being serviced by the victim. As a result, call drops, call failures, and slowing of service are likely to occur. In order to mitigate interference at a victim cell during a tropospheric ducting event, the present system selects an amplitude taper to be used for transmitting signals from a set of antenna elements at an aggressor base station based on the amplitude taper being determined to cause less interference than another amplitude taper.

Advantageously, providing methods and systems for selecting an antenna amplitude taper to transmit wireless signals to a coverage area during an atmospheric condition reduces interferences at a victim cell caused by unwanted signal transmission during the atmospheric condition (e.g., tropospheric ducting interference).

In one exemplary embodiment of the present technology, a system is provided for selecting an antenna amplitude taper to transmit wireless signals to a coverage area during an atmospheric condition. The system includes a base station configured to transmit the wireless signals to the coverage area, one or more processors, and one or more computer storage hardware devices storing computer-usable instructions. When used by the one or more processors, the computer-usable instructions cause the one or more processors to determine a first interference level in a victim cell when the wireless signals are transmitted to the coverage area from a set of antenna elements at the base station using a first amplitude taper. The computer-usable instructions also cause the one or more processors to determine a second interference level in the victim cell when the wireless signals are transmitted to the coverage area from the set of antenna elements at the base station using a second amplitude taper. The computer-usable instructions also cause the one or more processors to determine that the second interference level is less than the first interference level. The computer-usable instructions also cause the one or more processors to, upon determining that the second interference level is less than the first interference level, selecting the second amplitude taper to transmit the wireless signals to the coverage area from the set of antenna elements at the base station. The computer-usable instructions also cause the one or more processors to transmit the wireless signals to the coverage area from the set of antenna elements at the base station using the second amplitude taper.

In another exemplary embodiment of the present technology, a method is provided for selecting an antenna amplitude taper to transmit wireless signals to a coverage area during an atmospheric condition. The method includes determining a first interference level in a victim cell when the wireless signals are transmitted to the coverage area from a set of antenna elements at the base station using a first amplitude taper. The method also includes determining a second interference level in the victim cell when the wireless signals are transmitted to the coverage area from the set of antenna elements at the base station using a second amplitude taper. The method also includes determining that the second interference level is less than the first interference level. The method also includes, upon determining that the second interference level is less than the first interference level, selecting the second amplitude taper to transmit the wireless signals to the coverage area from the set of antenna elements at the base station. The method also includes transmitting the wireless signals to the coverage area from the set of antenna elements at the base station using the second amplitude taper.

In yet another exemplary embodiment of the present technology, one or more non-transitory computer-readable storage media having computer-executable instructions embodied thereon are provided that, when executed by one or more processors, cause the processors to perform various steps for selecting an antenna amplitude taper to transmit wireless signals to a coverage area from a base station during an atmospheric condition. The processors are caused to determine a first interference level in a victim cell when the wireless signals are transmitted to the coverage area from a set of antenna elements at the base station using a first amplitude taper. The processors are also caused to determine a second interference level in the victim cell when the wireless signals are transmitted to the coverage area from the set of antenna elements at the base station using a second amplitude taper. The processors are also caused to determine that the second interference level is less than the first interference level. The processors are also caused to, upon determining that the second interference level is less than the first interference level, select the second amplitude taper to transmit the wireless signals to the coverage area from the set of antenna elements at the base station. The processors are also caused to transmit the wireless signals to the coverage area from the set of antenna elements at the base station using the second amplitude taper.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 140 and 150. In some embodiments, the network environment 100 can be a telecommunication network (e.g., a telecommunication network such as, but not limited to, a wireless telecommunication network), or portion thereof. The network environment 100 can include one or more devices and components, such as base stations, servers, switches, relays, amplifiers, databases, nodes, etc. which are not shown so as to not confuse other aspects of the present disclosure. Those devices and components can provide connectivity in a variety of implementations. In addition the network environment 100 can be utilized in a variety of manners, such as a single network, multiple networks, or as a network of networks, but, ultimately, is shown as simplified as possible to avoid the risk of confusing other aspects of the present disclosure.

The network environment 100 can include or otherwise can be accessible through a cell site 110. In some embodiments, the cell site 110 can take the form of an aggressor cell site (e.g., a first cell site that emits a beam received at a victim cell site such as, but not limited to, a secondary cell site). The cell site 110 can include a set of antenna elements 103, base transmitter stations, radios, transmitter/receivers, digital signal processors, control electronics, GPS equipment, power cabinets or power supply, base stations, charging stations, etc. such that the cell site 110 can provide a communication link between the one or more user devices 140 and 150 and other components, systems, equipment, and/or devices of the network environment 100. The base station and/or a computing device (e.g., whether local or remote) associated with the base station can manage or otherwise control the operations of components of the cell site 110. The set of antenna elements 103 can emit a beam 105 that can cover a geographic area. The set of antenna elements 103 are capable of using beamforming as at least one signal procession operation. The beam 105 is operable in one or more beam modes.

In a stand-alone mode, the network environment 100 can take the form of a 5G network or any other suitable network. In some embodiments, the cell site 110 can be operable in a non-stand alone mode. In the non-stand alone (NSA) mode, the network environment 100 can take the form of, for example, an E-UTRAN New Radio-Dual Connectivity (EN-DC) network. In an EN-DC network, a user device (e.g., the user device 140 and/or 150) can connect to or otherwise access a 4G, LTE, 5G, 5G NR, or any other suitable network simultaneously.

Figure 2:
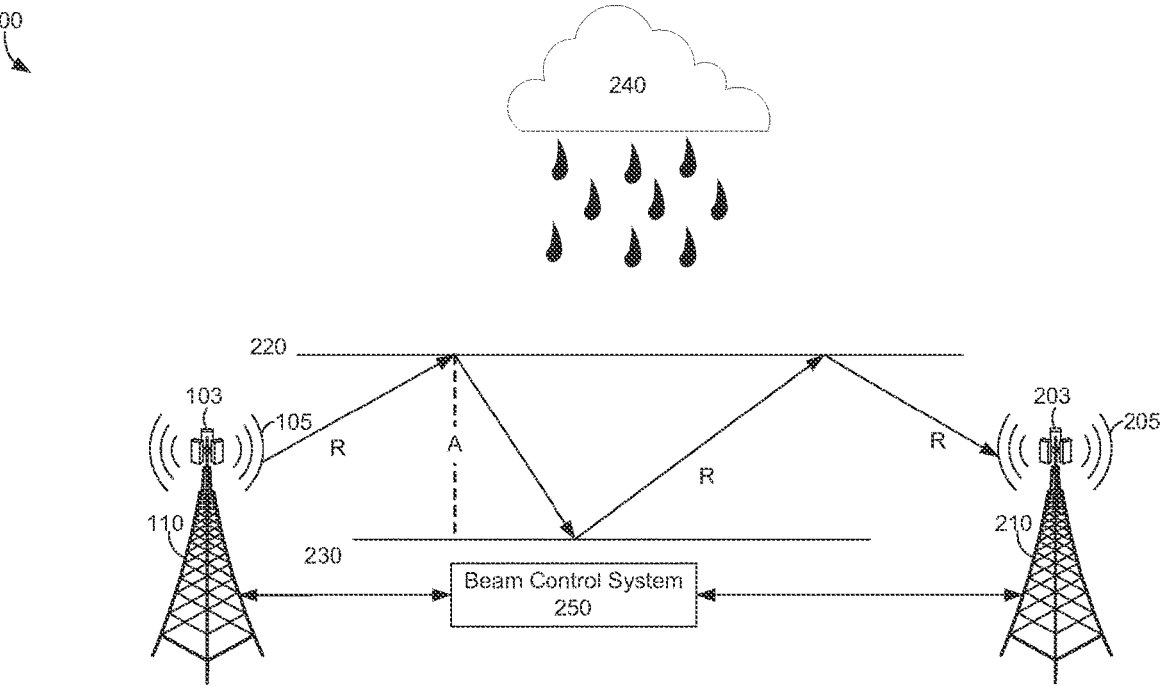
FIG. 2 is a diagram of a network environment including a plurality of cell sites and a beam control system in accordance with an example embodiment.

In some embodiments, the network environment 100 can include a beam control system (e.g., the beam control system 250 as illustrated in FIG. 2). The beam control system can include one or more nodes communicatively coupled to one or more cell sites (e.g., the cell site 110 (e.g., the aggressor cell site) and/or the cell site 210 (e.g., the victim cell site)). The beam control system can include one or more nodes communicatively coupled to the user device(s) 140 and/or 150 such that the beam control system can transmit to and receive requests and/or data from one or more user devices. The one or more nodes can include a Next Generation Node B (e.g., gNodeB or gNB) or any other suitable node structured to communicatively couple to the user device(s) 140 and/or 150. The one or more nodes can correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range.

In some embodiments, the network environment 100 can connect subscribers to a service provider or a plurality of service providers. Alternatively or additionally, the network environment 100 can be associated with a specific telecommunication provider that provides services (e.g. 5G, voice, location, etc.) to one or more user devices 140 and/or 150. For example, the user devices 140 and 150 can be subscribers to a telecommunication service provider, in which the user devices 140 and 150 are registered or subscribed to receive voice and data services over the network environment 100. The network environment 100 can include any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), or a 5G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components can be utilized in implementations of the present invention. It will be understood to those of ordinary skill in the art that the components can be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components can be represented as singular components or may be represented in a particular quantity in FIG. 1, it will be appreciated that some aspects can include a plurality of devices and/or components such that FIG. 1 should not be considered as limiting the quantity of any device and/or component.

FIG. 2 is a diagram of the network environment 200 (e.g., a telecommunication network such as, but not limited to, a wireless telecommunication network) including a plurality of cell sites and a beam control system 250 according to an example embodiment. In the present embodiment, the network environment 200 includes sets of antenna elements 103 and 203, beams 105 and 205, cell sites 110 and 210, and beam control system 250. Although some of the components in the network environment 200 are depicted as single components (e.g., a single beam control system), in some embodiments, the network environment 200 can include a plurality of such components from 1 to N.

In some embodiments, the beam control system 250 can include one or more nodes such that the beam control system 250 can include or otherwise take the form of a 5G massive MIMO capable gNodeB (e.g., the gNodeB can be communicatively coupled to an antenna structured for massive multiple-input and multiple-output (mMIMO)). The beam control system 250 can be included within a cell site, external to a cell site, or otherwise communicatively coupled to a cell site.

During certain atmospheric conditions 240, one or more layers of the air can form an atmospheric signal guide in the atmosphere (e.g., the troposphere, stratosphere, mesosphere, thermosphere, and/or exosphere). For example, one or more layers (e.g., the layers 220 and 230) of the air can form a waveguide in the troposphere such that an atmospheric condition includes or otherwise forms a tropospheric duct A (e.g., signals can be refracted, scattered, reflected, etc.) between layers 220 and 230. In some examples, the atmospheric condition (e.g., the tropospheric duct or tropospheric ducting) can last for a variable period of time such as, but not limited to, between a few minutes to a plurality of hours.

Figure 3A:
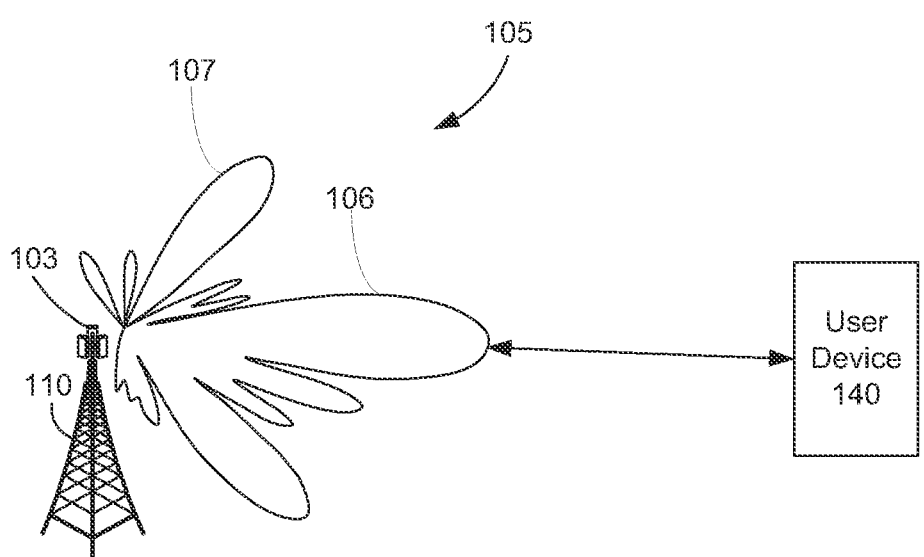
FIG. 3A is a diagram of the network environment of FIG. 2 depicting a beam formed by a cell site of the plurality of cell sites in accordance with an example embodiment.

One or more directional signals (e.g., the radio signal R) can travel between cell sites (e.g., the cell sites 110, 210) during the atmospheric condition. For example, the directional signal (e.g., the radio signal R) that enters the duct can travel hundreds of kilometers with low propagation losses from the cell site 110 (e.g., the aggressor cell cite) and cause interference a distance from the transmitter at the cell site 210 (e.g., the victim cell site). The radio signal R can be transmitted by the beam 105, which can comprise a primary beam 106 and an upper side lobe 107 as seen in FIG. 3A. Specifically, the radio signal R can originate from the upper side lobe 107 of the beam 105. Conventionally, cell site antennas are specified such that they only suppress the first upper side lobe of a beam to minimize interference to/from a neighbor cell. This generally means that the rest of the upper side lobes are unspecified, which can result in them being more pronounced and capable of transmitting signals (e.g., signal R) that cause interference.

The beam control system 250 can determine, via the cell site 210 (e.g., the victim cell site), whether a rise of interference (e.g., interference at the victim cell site) is greater than a predetermined threshold during the atmospheric condition. An interference level at the cell site 210 can be determined by measuring a noise level in one or more uplink timeslots caused by downlink signal transmitted by cell site 110 (e.g., signal R).

The beam control system 250 can manage the signaling within the network 200 (e.g., selection of an amplitude taper to be used) of one or more antennas (e.g., the set of antenna elements 103). In this regard, the beam control system 250 can feed the set of antenna elements 103 an excitation pattern to form the beam 105. Once the amplitude taper is selected, the beam control system 250 can manage the transmission of wireless signals from cell site 110 through the beam 105 to the coverage area using the selected amplitude taper.

Mitigation techniques (e.g., method 400 of FIG. 4) can be implemented upon a determination by the beam control system 250 that an interference level (e.g., a rise in interference) at the cell site 210 (e.g., the victim cell) is greater than a predetermined threshold during an atmospheric condition (e.g., a tropospheric ducting event). In some aspects, mitigation techniques can be implemented upon a determination by the beam control system 250 that performance at cell site 210 is below a predetermined threshold. In some aspects, the beam control system 250 can identify the cell site 110 as the aggressor cell based on a physical cell identifier (PCI) or any other cell identifying value that is transmitted in the downlink signals being emitted by the cell site 110 and received at the cell site 210 (e.g., signal R from the beam 105). In such an aspect, the downlink signals from the offending base station may be received by the cell site 210 or any other device configured to receive and process downlink signals that is located in the coverage area served by the cell site 210.

In some embodiments, the beam control system 250 can identify that a base station (e.g., cell site 110) is transmitting signals (e.g., signal R) that are causing interference at a victim cell (e.g., cell site 210). In some aspects, the beam control system 250 determines that an interference level at the cell site 210 is greater than a predetermined threshold and/or determine that performance at the cell site 210 is below a predetermined threshold. Based on such identifications and/or determinations, the beam control system 250 can implement mitigation techniques to select an amplitude taper that will cause less interference and/or performance degradation.

In such embodiments, the beam control system 250 can select a first amplitude taper to be used by a set of antenna elements 103 at the cell site 110 to transmit signals to a coverage area serviced by the cell site 110 (e.g., an excitation radiation pattern provided to the set of antenna elements 103 to form the first amplitude). In some aspects, the first amplitude taper is selected among a plurality of predetermined excitation radiation patterns. For example, the plurality of predetermined excitation radiation patterns could comprise one or more of a Chebyshev amplitude taper, a Taylor amplitude taper, a cosine amplitude taper, a binomial amplitude taper, or any other suitable amplitude taper as will be apparent to one skilled in the art. In some aspects, the first amplitude taper used by the cell site 110 is the Taylor amplitude taper as seen in FIG. 3B. The beam control system 250 can determine a first interference level at the cell site 210 when the cell site 110 transmits wireless signals to the coverage area using the first amplitude taper. In some aspects, the first interference level is determined during a first time period. The beam control system 250 can also select a second amplitude taper to be used by the set of antenna elements 103 at the cell site 110 to transmit signals to the coverage area. In some aspects, the second amplitude taper is also selected from the plurality of predetermined excitation radiation patterns. In some aspects, the second amplitude taper used by the cell site 110 is the Chebyshev amplitude taper as seen in FIG. 3C. The beam control system 250 can determine a second interference level at the cell site 210 when the cell site 110 transmits the wireless signals to the coverage area using the second amplitude taper. In some aspects, the second interference level is determined during a second time period. The beam control system 250 can determine whether the first interference level is less than the second interference level. For example, the beam control system 250 could determine that the second interference level is less than the first interference level and, based upon such a determination, the beam control system 250 could select the second amplitude taper to be used by the cell site 110 to transmit the wireless signals to the coverage area from the set of antenna elements 103. Accordingly, the beam control system 250 can direct the cell site 110 to transmit the wireless signals to the coverage area from the set of antenna elements 103 using the second amplitude taper.

Continuing with the example embodiments, it can be seen from FIGS. 3B and 3C that an aperture of a primary beamform of the Taylor Beamform (e.g., the first amplitude taper) can be generally the same as an aperture of a primary beamform of the Chebyshev Beamform (e.g., the second amplitude taper). This ensures that the primary beamform will still be able to provide adequate service to users serviced by the cell site 110 in the coverage area. Notably, sides lobes between the Taylor Beamform (e.g., the first amplitude taper) and the Chebyshev Beamform (e.g., the second amplitude taper) are different, although all side are relatively suppressed in both beamforms compared to conventional beamforms with unspecified upper lobes. The differences in the elevation plane between the sides lobes of the Taylor Beamform (e.g., the first amplitude taper) and the Chebyshev Beamform (e.g., the second amplitude taper) can be responsible for a difference between the first interference level and the second interference level, as determined by the beam control system 250.

In other embodiments, the beam control system 250 can determine that a first interference level at the cell site 210 is greater than a predetermined threshold based on the cell site 110 transmitting wireless signals (e.g., the beam 105) from a set of antenna elements 103 using a first amplitude taper.

The first interference level can be determined during a first time period. In such an embodiment, the first amplitude taper being used by the set of antenna elements 103 at the cell site 110 can comprise an upper side lobe 107 (FIG. 3), which sends signal R to the cell site 210. Said another way, the beam control system 250 can identify the first amplitude taper used by the set of antenna elements 103 at the cell site 110 as causing the first interference level. In response, the beam control system 250 can determine a second amplitude taper to be used by the set of antenna elements 103 at the cell site 110. In some aspects, the second amplitude taper is selected among a plurality of predetermined excitation radiation patterns that can be provided to the set of antenna elements 103 to form the second amplitude taper (e.g., one or more of a Chebyshev amplitude taper, a Taylor amplitude taper, a cosine amplitude taper, a binomial amplitude taper, etc.). In order to continue to providing a similar quality of service to users serviced by the cell site 110, an aperture of a primary beamform of the first amplitude taper can be generally the same as an aperture of a primary beamform of the second amplitude taper. For example, as seen in FIG. 3, the beam 105 can comprise a primary beam 106 and an upper side lobe 107 that transmits signal R to the cell site 210 when using the first amplitude taper. Continuing with the example, when using the second amplitude taper, the beam 105 can comprise a primary beam 106 having an aperture that is generally the same as an aperture when the first amplitude taper is used; however, an upper side lobe 107 formed using the second amplitude taper would not transmit signal R to the cell site 210.

Advantageously, selecting an antenna amplitude taper to transmit wireless signals to a coverage area from a base station (e.g., an aggressor cell) during an atmospheric condition reduces interference and performance degradation caused by unwanted signals at another base station (e.g., a victim cell).

In another example embodiment, the beam control system 250 can select an amplitude taper to transmit wireless signals to a coverage area from a victim cell in order to reduce interference during an atmospheric condition. In such an embodiment, an upper side lobe 107 transmitted by a cell site 110 (e.g., an aggressor cell) can result in an angle-of-arrival of a signal R at a cell site 210 (e.g., a victim cell) that causes interference at the victim cell site 210. In order to reduce this interference, the beam control system 250 can determine an amplitude taper whose beamforming structure mitigates interference to transmit the wireless signals to the coverage area. For example, an amplitude taper can be selected whose radiation side lobe structure reduces interference caused by signal R at the angle-of-arrival (e.g., reduces receptivity of unwanted signals in the uplink timeslots at the victim cell site 210). In other examples where the angle-of-arrival of signal R is closer to a main lobe, the beam control system 250 can select an amplitude taper that narrows the main lobe to reduce interference (e.g., using a "uniform" excitation pattern where every array element is fed equally). The beam control system 250 can implement such an embodiment during an initial call setup, periodic channel optimization, or any other suitable time. A plurality of predetermined amplitude tapers can be used by the beam control system 250 to determine which amplitude taper causes the least amount of interference (e.g., determining interference levels of a first amplitude taper and a second amplitude taper) during the aforementioned times. The victim cell site 210 can then transmit signals to the coverage area using the selected amplitude taper. Such an embodiment allows the beam control system 250 to manage beamforming at the victim cell site 210 without communicating or being linked to the aggressor cell site 110. The beam control system 250 can also mitigate interference at the victim cell site 210 when the source (e.g., aggressor cell site 110) is unknown or not within the network environment 200. In some cases, the beam control system 250 is located entirely on the cell site 210.

FIG. 4 depicts a flow diagram of an exemplary method 400 for selecting an antenna amplitude taper to transmit wireless signals to a coverage area during an atmospheric condition, in accordance with implementations of the present disclosure.

At block 402, a first interference level at a victim cell is determined when wireless signals are transmitted to a coverage area from a set of antenna elements at a base station using a first amplitude taper.

At block 404, a second interference level at a victim cell is determined when wireless signals are transmitted to a coverage area from a set of antenna elements at a base station using a second amplitude taper.

In some aspects, the first interference level and the second interference level are determined by measuring a noise level in one or more uplink timeslots at the victim cell. In some aspects, an aperture of a primary beamform of the first amplitude taper is generally the same as an aperture of a primary beamform of the second amplitude taper. In some aspects, the first amplitude taper and the second amplitude taper are selected among a plurality of predetermined excitation radiation patterns provided to the set of antenna elements to form the first amplitude taper and the second amplitude taper. In some aspects, the first amplitude taper and the second amplitude taper comprise one or more of a Chebyshev amplitude taper, a Taylor amplitude taper, a cosine amplitude taper, and a binomial amplitude taper.

At block 406, the second interference level is determined to be less than the first interference level. In some aspects, the first interference level is determined during a first time period and the second interference level is determined during a second time period. In some aspects, the first interference level and the second interference level are determined based on a determination that performance in the victim cell is below a predetermined threshold (e.g., a mitigation technique comprising comparing a first interference level using a first amplitude taper and a second interference level using a second amplitude taper in order to select the amplitude taper that causes less interference is implemented upon a determination that performance in a victim cell is below a predetermined threshold).

At block 408, the second amplitude taper is selected to transmit the wireless signals to the coverage area from the set of antenna elements at the base station based upon a determination that the second interference level is less than the first interference level.

At block 410, the wireless signals are transmitted to the coverage area from the set of antenna elements at the base station using the second amplitude taper.

Figure 5:
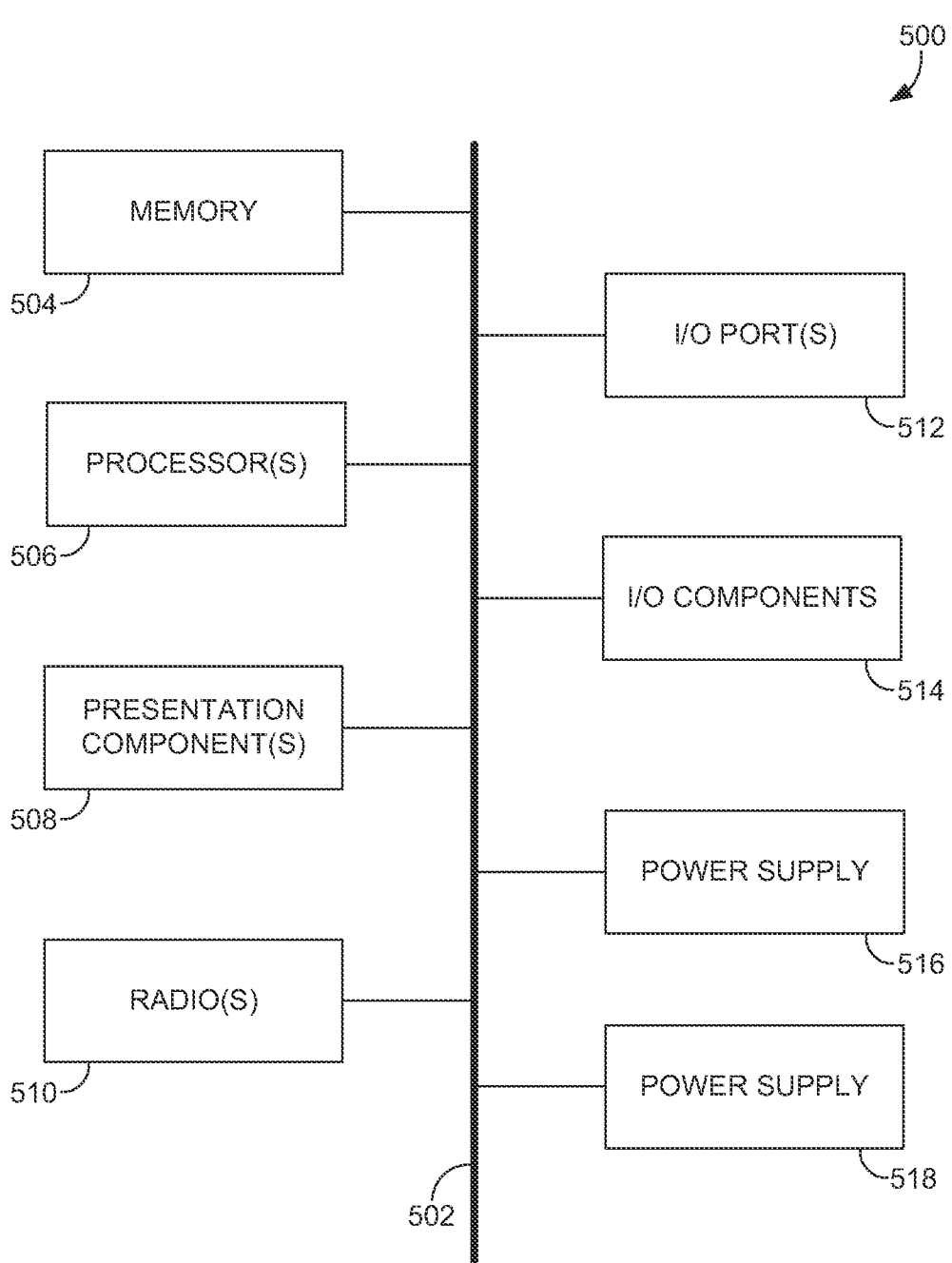
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device

500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly couple one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunication network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 3G, 4G, LTE, mMIMO, 5G, 6G, NR, VOLTE, and/or other VoIP communications. As can be appreciated, in various embodiments, radio(s) 510 may be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A system for selecting an antenna amplitude taper to transmit wireless signals to a coverage area during an atmospheric condition, the system comprising:
   a base station configured to transmit the wireless signals to the coverage area;
   one or more processors; and
   one or more computer storage hardware devices storing computer-usable instructions that, when used by the one or more processors, cause the one or more processors to:
   determine a first interference level at a victim cell when the wireless signals are transmitted to the coverage area from a set of antenna elements at the base station using a first amplitude taper;
   determine a second interference level at the victim cell when the wireless signals are transmitted to the coverage area from the set of antenna elements at the base station using a second amplitude taper;
   determine that the second interference level is less than the first interference level;
   upon determining that the second interference level is less than the first interference level, select the second amplitude taper to transmit the wireless signals to the coverage area from the set of antenna elements at the base station; and transmit the wireless signals to the coverage area from the set of antenna elements at the base station using the second amplitude taper.

2. The system of claim 1, wherein the first interference level and the second interference level are determined by measuring a noise level in one or more uplink timeslots at the victim cell.

3. The system of claim 1, wherein an aperture of a primary beamform of the first amplitude taper is generally the same as an aperture of a primary beamform of the second amplitude taper.

4. The system of claim 1, wherein the first amplitude taper and the second amplitude taper are selected among a plurality of predetermined excitation radiation patterns provided to the set of antenna elements to form the first amplitude taper and the second amplitude taper.

5. The system of claim 1, wherein the first amplitude taper and the second amplitude taper comprises one or more of a Chebyshev amplitude taper, a Taylor amplitude taper, a cosine amplitude taper, and a binomial amplitude taper.

6. The system of claim 1, wherein the one or more processors determine the first interference level and the second interference level based on a determination that performance at the victim cell is below a predetermined threshold.

7. The system of claim 1, wherein the first interference level is determined during a first time period and the second interference level is determined during a second time period.

8. A method for selecting an antenna amplitude taper to transmit wireless signals to a coverage area during an atmospheric condition, the method comprising:

determining a first interference level at a victim cell when the wireless signals are transmitted to the coverage area from a set of antenna elements at the base station using a first amplitude taper;

determining a second interference level at the victim cell when the wireless signals are transmitted to the coverage area from the set of antenna elements at the base station using a second amplitude taper;

determining that the second interference level is less than the first interference level;

upon determining that the second interference level is less than the first interference level, select the second amplitude taper to transmit the wireless signals to the coverage area from the set of antenna elements at the base station; and transmitting the wireless signals to the coverage area from the set of antenna elements at the base station using the second amplitude taper.

9. The method of claim 8, wherein the first interference level and the second interference level are determined by measuring a noise level in one or more uplink timeslots at the victim cell.

10. The method of claim 8, wherein an aperture of a primary beamform of the first amplitude taper is generally the same as an aperture of a primary beamform of the second amplitude taper.

11. The method of claim 8, wherein the first amplitude taper and the second amplitude taper are selected among a plurality of predetermined excitation radiation patterns provided to the set of antenna elements to form the first amplitude taper and the second amplitude taper.

12. The method of claim 8, wherein the first amplitude taper and the second amplitude taper comprises one or more of a Chebyshev amplitude taper, a Taylor amplitude taper, a cosine amplitude taper, and a binomial amplitude taper.

13. The method of claim 8, wherein the one or more processors determine the first interference level and the second interference level based on a determination that performance at the victim cell is below a predetermined threshold.

14. The method of claim 8, wherein the first interference level is determined during a first time period and the second interference level is determined during a second time period.

15. One or more non-transitory computer-readable media having computer-executable instructions embodied thereon that, when executed, perform a method for selecting an antenna amplitude taper to transmit wireless signals to a coverage area from a base station during an atmospheric condition, the method comprising:

determining a first interference level at a victim cell when the wireless signals are transmitted to the coverage area from a set of antenna elements at the base station using a first amplitude taper;

determining a second interference level at the victim cell when the wireless signals are transmitted to the coverage area from the set of antenna elements at the base station using a second amplitude taper;

determining that the second interference level is less than the first interference level;

upon determining that the second interference level is less than the first interference level, select the second amplitude taper to transmit the wireless signals to the coverage area from the set of antenna elements at the base station; and transmitting the wireless signals to the coverage area from the set of antenna elements at the base station using the second amplitude taper.

16. The method of claim 15, wherein the first interference level and the second interference level are determined by measuring a noise level in one or more uplink timeslots at the victim cell.

17. The method of claim 15, wherein an aperture of a primary beamform of the first amplitude taper is generally the same as an aperture of a primary beamform of the second amplitude taper.

18. The method of claim 15, wherein the first amplitude taper and the second amplitude taper are selected among a plurality of predetermined excitation radiation patterns provided to the set of antenna elements to form the first amplitude taper and the second amplitude taper.

19. The method of claim 15, wherein the second amplitude taper is one or more of a Chebyshev amplitude taper, a Taylor amplitude taper, a cosine amplitude taper, and a binomial amplitude taper.

20. The method of claim 15, wherein the one or more processors determine the first interference level and the second interference level based on a determination that performance at the victim cell is below a predetermined threshold.

* * * * *